United States Patent [19]

Bennett

[11] Patent Number: 5,177,455

[45] Date of Patent: Jan. 5, 1993

[54] DIGITAL PHASE AND AMPLITUDE MODULATOR

[75] Inventor: Steven J. Bennett, Surrey, Canada

[73] Assignee: MPR Teltech Ltd., Burnaby, Canada

[21] Appl. No.: 823,967

[22] Filed: Jan. 22, 1992

[51] Int. Cl.$^5$ .................................. H04L 27/00
[52] U.S. Cl. ..................... 332/103; 375/39; 375/55; 375/67
[58] Field of Search ............ 332/103, 104, 105; 375/39, 52, 55, 67

[56] References Cited

U.S. PATENT DOCUMENTS

| Re. 33,056 | 9/1989 | Forney, Jr. et al. | 332/103 X |
| 4,613,976 | 9/1986 | Sewerinson et al. | 332/103 X |
| 4,736,389 | 4/1988 | Debus, Jr. et al. | 332/104 X |
| 4,750,192 | 6/1988 | Dzung | 332/104 X |

Primary Examiner—Robert J. Pascal
Attorney, Agent, or Firm—Shlesinger, Arkwright & Garvey

[57] ABSTRACT

A digital modulator for modulating a stream of incoming data bits in which at least each one of the bits corresponds to a symbol. The modulator includes storage for each incoming set of symbol bits, where there is at least one bit in each set, of "n" successive symbols where "n" is a positive integer with a value greater than or equal to 1, with the oldest stored set being discarded upon the arrival and storage of a next set of symbol bits. Memory stores sample values corresponding to a modulated symbol impulse response for each of a predetermined number of symbols wherein the modulated symbol impulse responses each extend over "n" symbol periods. Sample values over one symbol period are retrieved from the memory for overlapping portions of each of the modulated symbol impulse responses stored in the storage. An adder sums the sample values which correspond to each other in time for each of the modulated symbol impulse responses corresponding to the received symbols. A converter converts summed digital sample values to an analog signal for subsequent transmission.

17 Claims, 15 Drawing Sheets

| S1 | S2 | S3 | S4 | S5 |
|----|----|----|----|----|
| 0  | 1  | 0  | 0  | 1  |
| 0  | 1  | 1  | 0  | 0  |
| 1  | 0  | 1  | 0  | 0  |
| 0  | 1  | 0  | 1  | 1  |

DIGITAL PHASE AND AMPLITUDE MODULATOR

FIELD

The present invention relates to a digital phase and amplitude modulator for use in transforming digital data into phase and amplitude modulated signals for use in digital transmissions.

BACKGROUND

In the transmission of signals over various transmission media it is generally easier to transmit and process binary signals than analogue signals because of the greater immunity from noise of binary transmission. However, the conventional method of processing the incoming data is to use it to modulate a carrier signal by generating both an in-phase and a quadrature resolved component of the modulating data. Each component is then filtered for bandwidth limiting and pulse shaping. The two filtered baseband signals are then individually mixed with the carrier frequency, the in-phase signal with the carrier itself and the quadrature signal with a 90 degree shifted version of the carrier. The two resulting amplitude modulated signals are then combined and the resulting carrier signal has both phase and amplitude modulation.

There are several disadvantages to the current method. The baseband filtering, quadrature splitting of the carrier and the amplitude balancing of the separate components have to be carefully matched or tuned for matching of the filter characteristics and balancing of the phase and amplitude. Even if such matching and balancing is done the components still produce variations in performance due to temperature variations and aging.

SUMMARY OF THE INVENTION

According to the invention there is provided a digital modulator for modulating a stream of incoming data bits in which at least each one of the bits corresponds to a symbol. The modulator includes means for storing each incoming set of symbol bits, where there is at least one bit in each set, of "n" successive symbols where "n" is a positive integer with a value greater than or equal to 1, with the oldest stored set being discarded upon the arrival and storage of a next set of symbol bits. Memory means store sample values corresponding to a modulated symbol impulse response for each of a predetermined number of symbols wherein the modulated symbol impulse responses each extend over "n" symbol periods. Means for retrieving sample values over one symbol period from the memory means for overlapping portions of each of the modulated symbol impulse responses stored in the storing means are also provided. Summing means sums the sample values which correspond to each other in time for each of the modulated symbol impulse responses corresponding to the received symbols. Converter means converts summed digital sample values to an analog signal for subsequent transmission.

The storing means may be a shift register. The memory means may be a programmable semiconductor memory array. The converter means may be a digital to analog converter.

The retrieving means may include a decoder having "n" symbol inputs and a counter having sufficient least significant bit lines coupled to a select input to the decoder so that data on any one of the "n" symbol bus lines applied to symbol inputs of the said decoder may be selected and applied as most significant address bits to the memory means and least significant bit lines of the counter are applied as least significant address bits to the memory means.

Preferably the stored sample values include an offset added to the stored sample values such that when the sample values are added for any combination of stored impulse responses in the shift register, the resultant offset equals the centre value of the input numerical range of the digital to analog converter.

The present method simplifies the modulation by generating the modulated signal directly with the required filtering. The need for tuning of the components for filtering is avoided. Flexibility in filtering is accomplished by simply changing the contents of a digital memory or by switching from one to another. Arbitrary phases and amplitudes can also be generated as can arbitrary filter characteristics. Predistortion may be introduced in the stored values to counteract the effects of amplitude and phase distortion in a transmission system.

Another important improvement is the signal to noise performance due to elimination of the need to compensate for a "non-return to zero" input waveform in the filtering.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

FIGS. 2a to 2f are a set of waveforms corresponding to a set of five symbols with associated 4-bit symbols shown for a conventional system as in FIG. 1 but without filtering;

Figure 10:
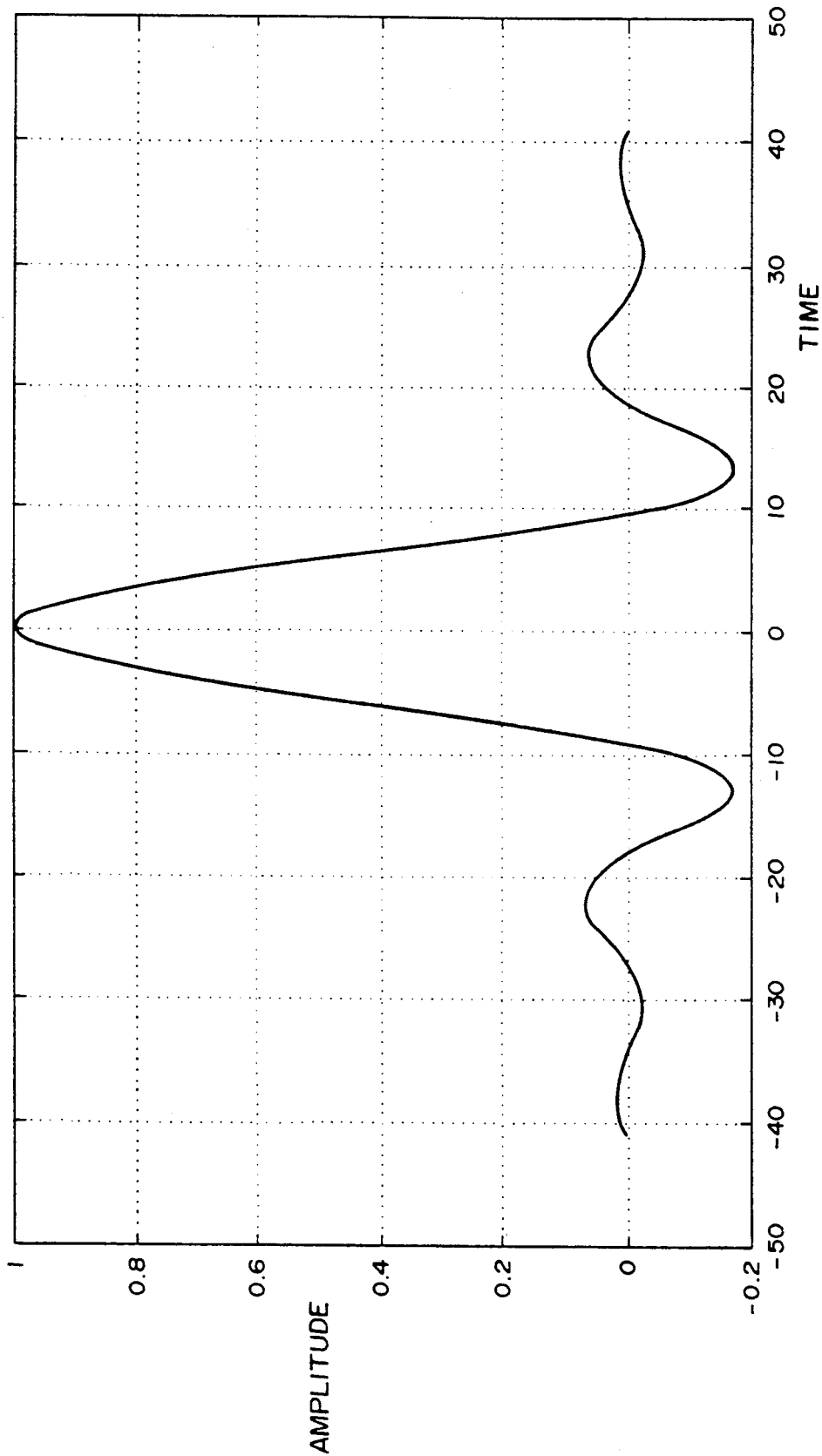
FIG. 10 is a waveform for a normalized symbol impulse response as a function of time over a period of 8 symbols.
Figure 11:
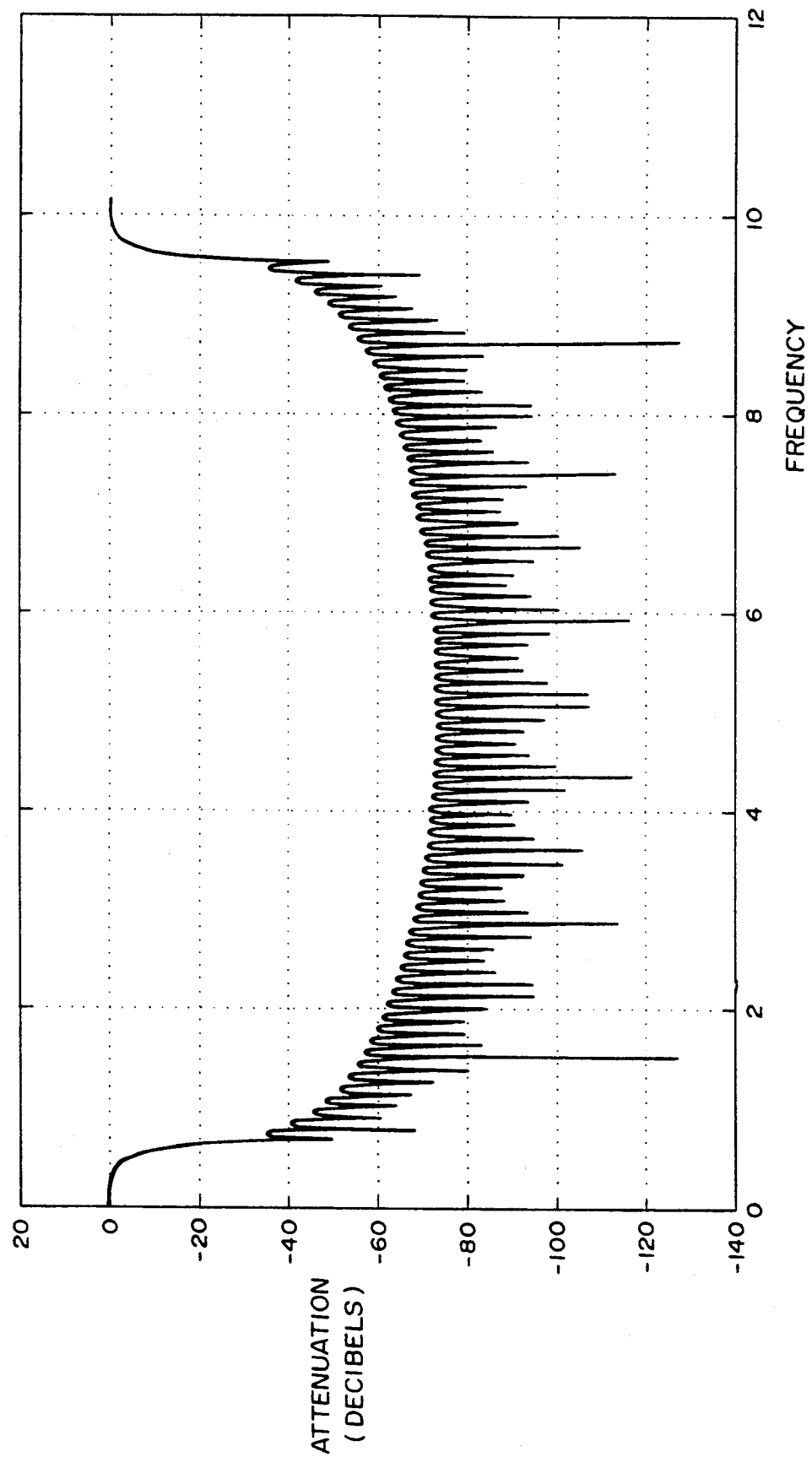
Figure 12:
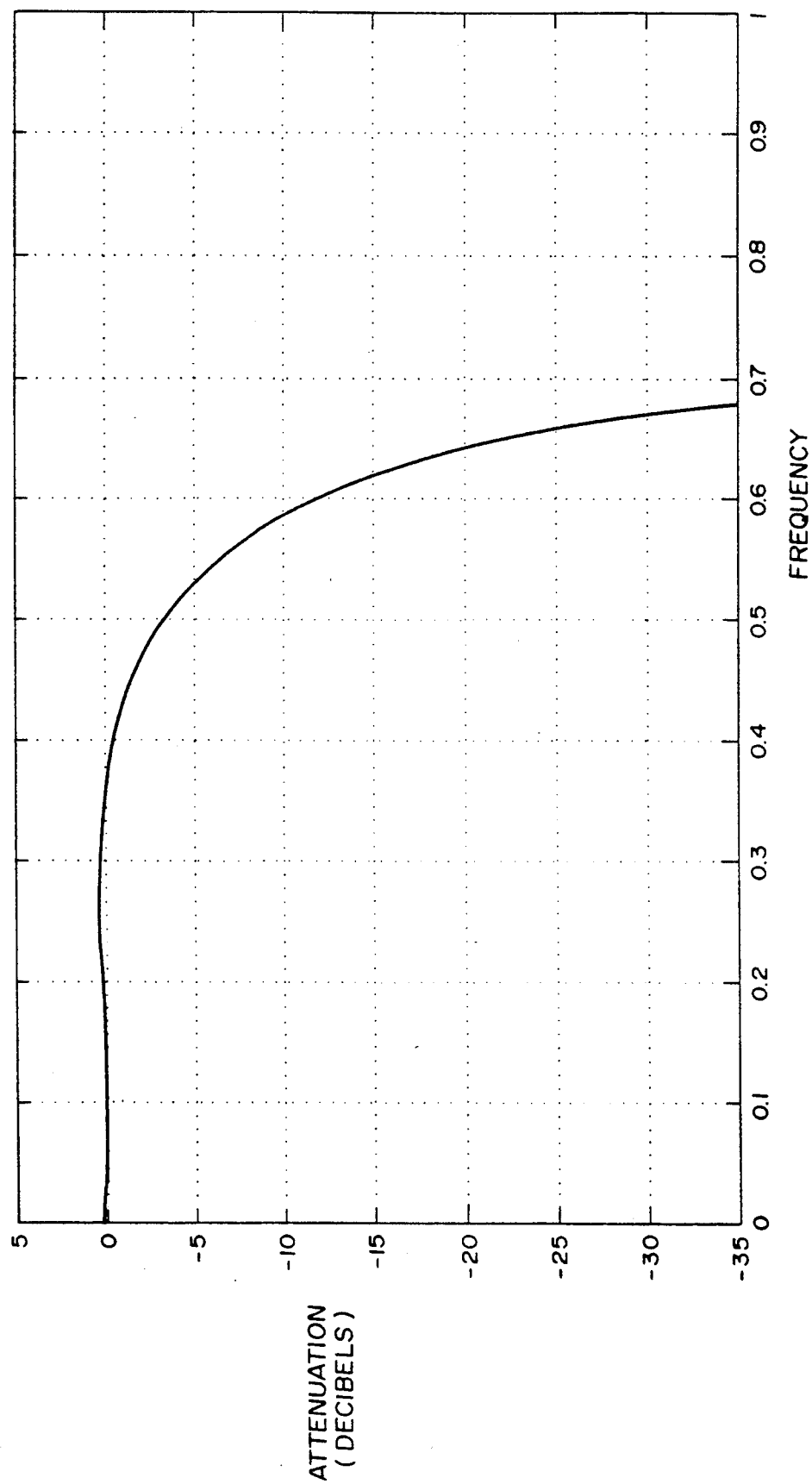
Figure 13:
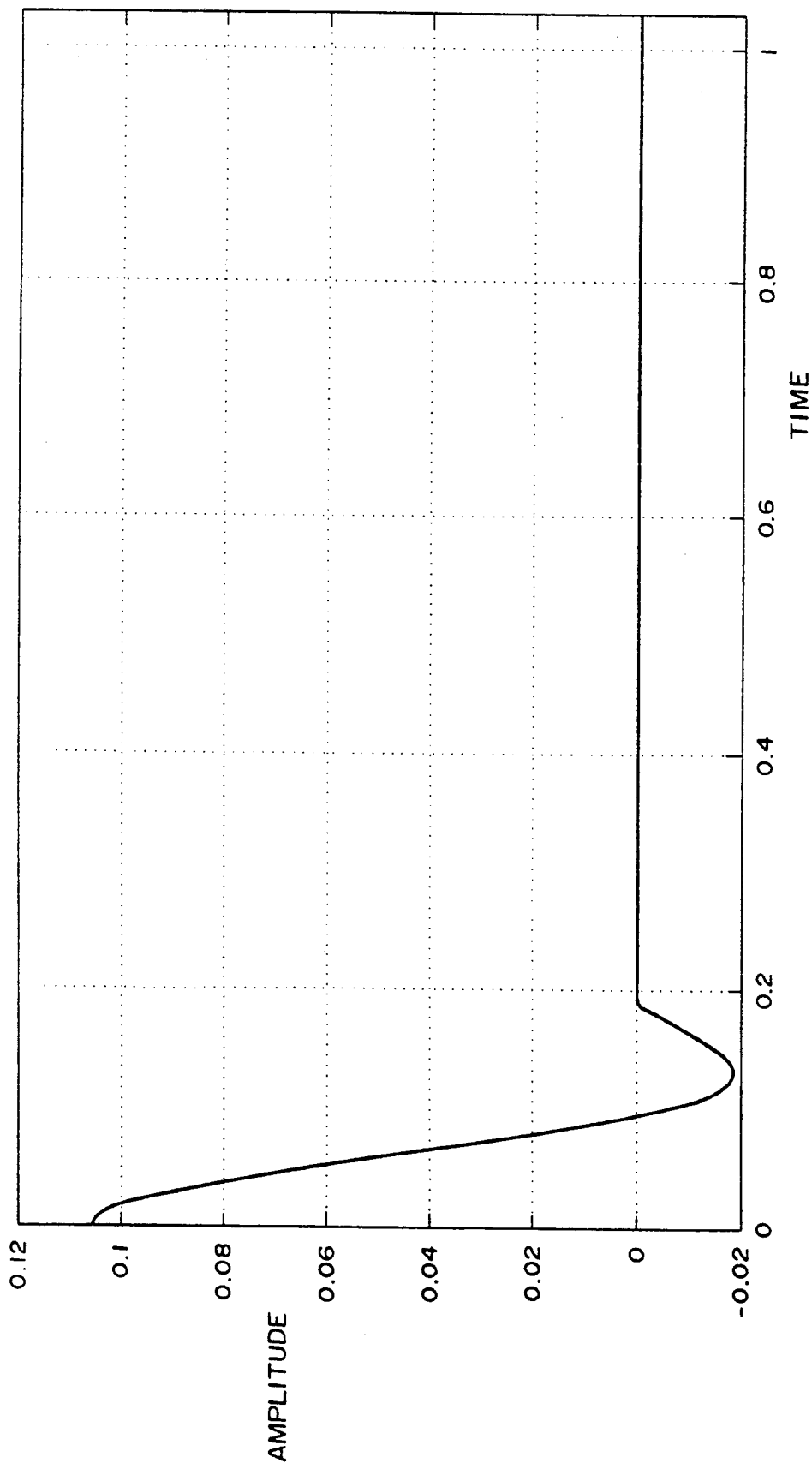
Figure 14:
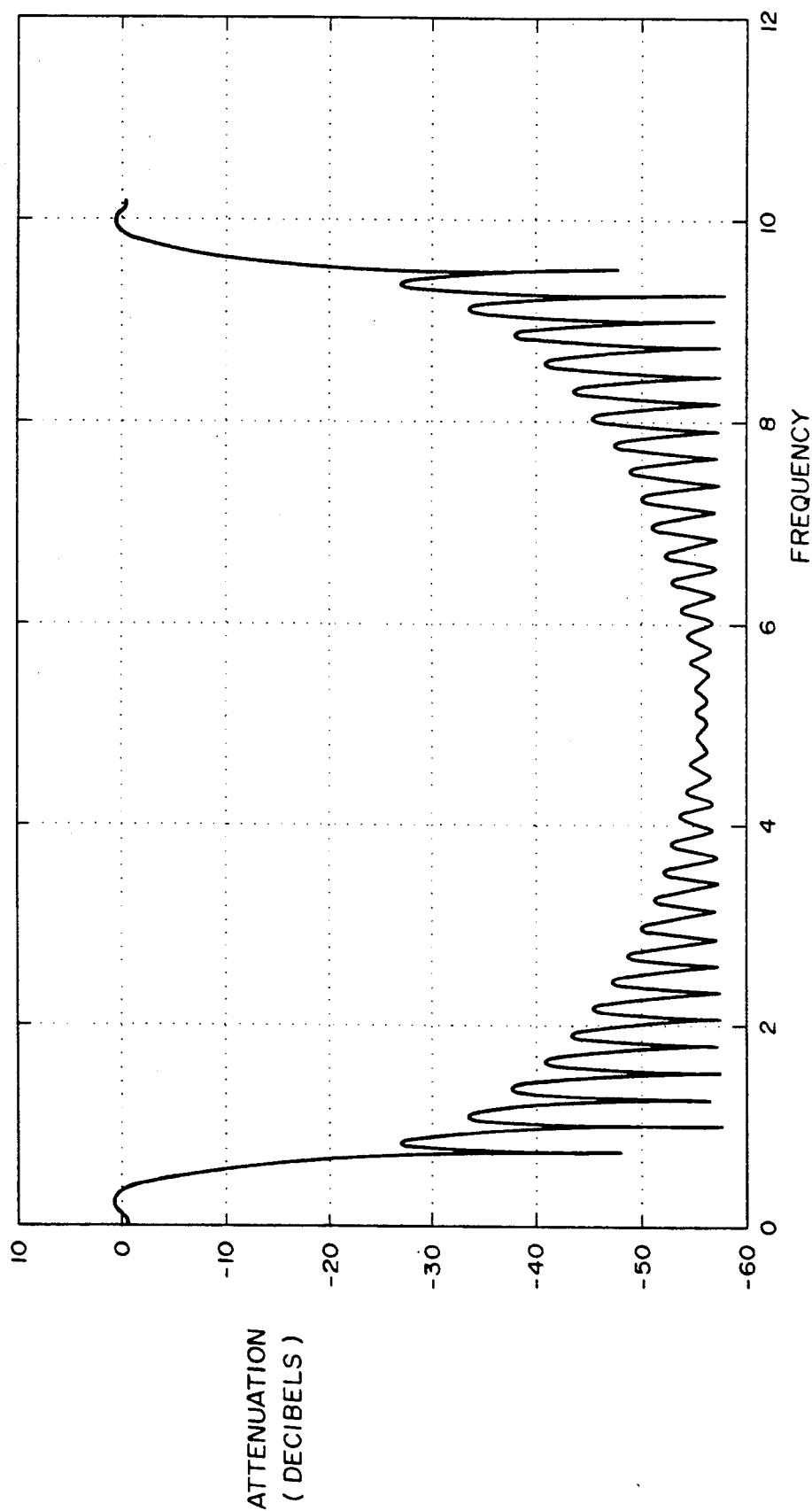

FIG. is a Fourier Transform of the waveform of FIG. 10 showing power as a function of frequency;

FIG. 12 is an expanded graph of the waveform of FIG. 11;

FIG. 13 is a waveform of voltage versus time with the wave truncated after the first undershoot;

FIG. 14 is a graph of the Fourier Transform of the waveform of FIG. 13; and

Figure 15:
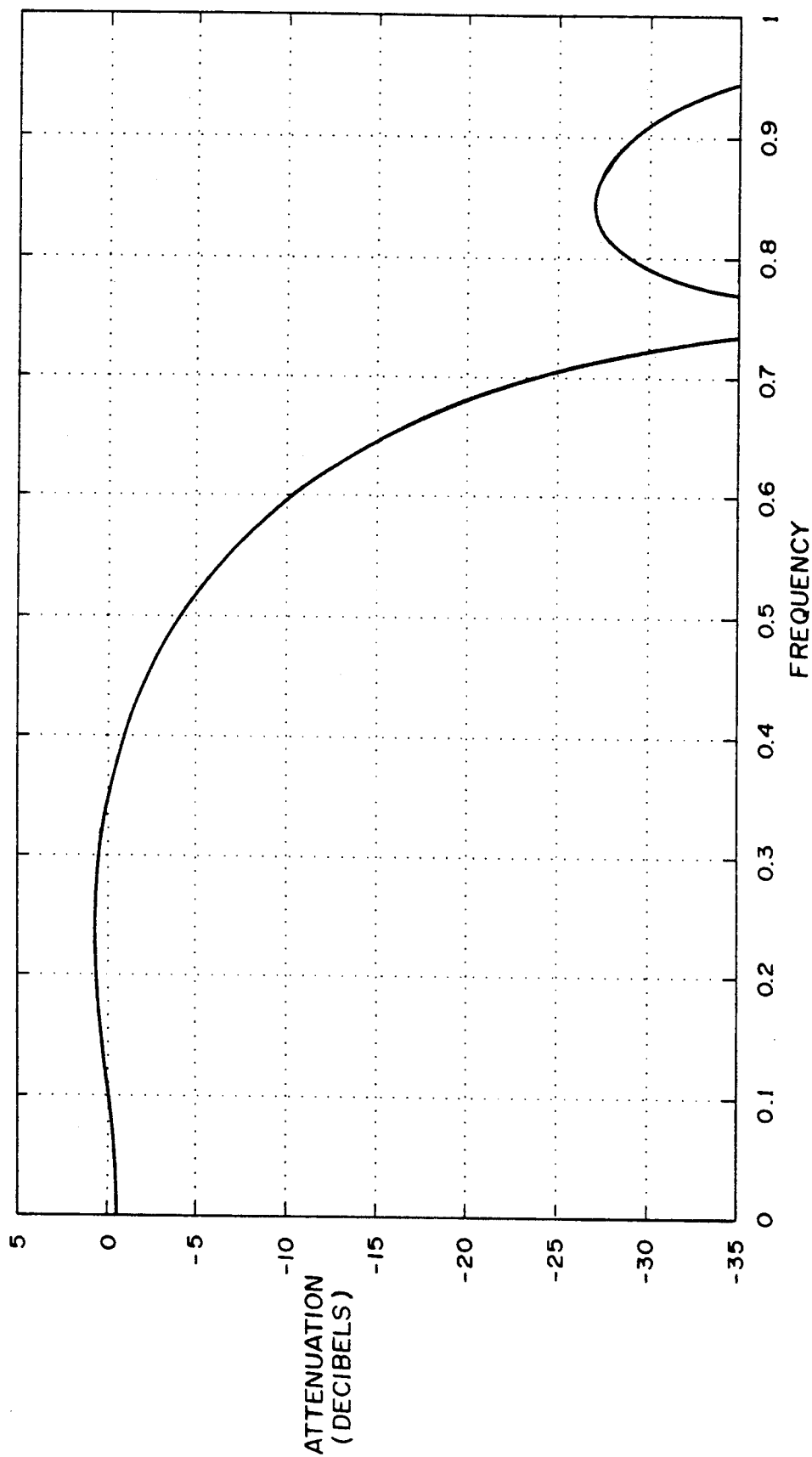

FIG. 15 is an expanded graph of the waveform of FIG. 14.

DETAILED DESCRIPTION WITH REFERENCE TO THE DRAWINGS

Figure 1:
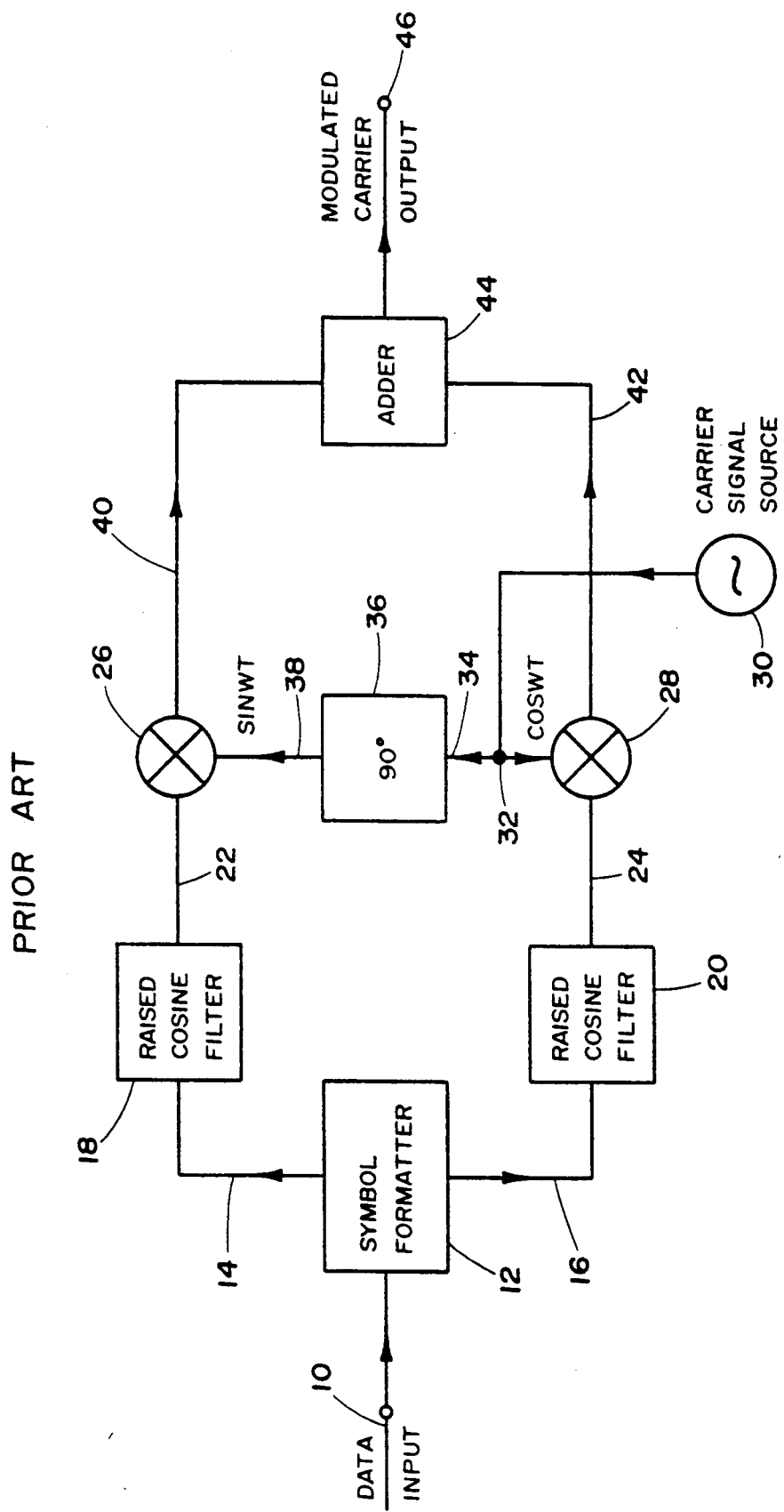
FIG. 1 is a schematic diagram showing a conventional arrangement for using input data to modulate both phase and amplitude of a carrier signal.
Figure 2B:
Figure 2C:
Figure 2A:
Figure 2A:
Figure 2E:
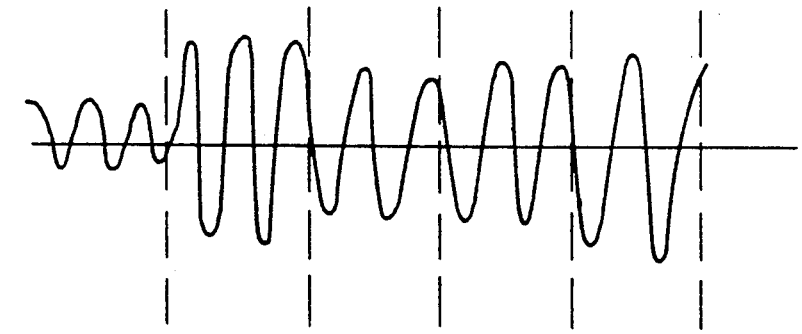
Figure 2F:
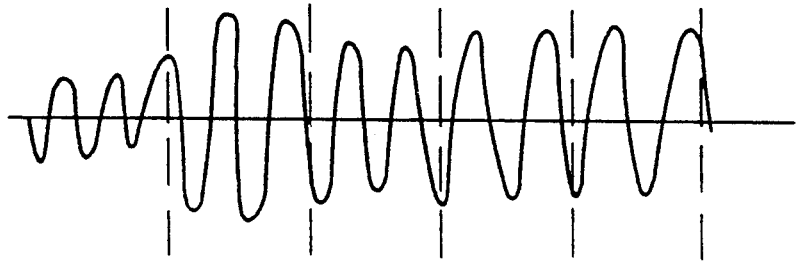

Referring to FIG. 1, there is shown a diagram of a conventional scheme for using an incoming data stream to modulate a carrier signal so that the modulated carrier signal can be optimally transmitted over a signal transmission line. The incoming stream of digital data arriving on line 10 is directed into a symbol formatter 12 which takes several bits of incoming data and forms a symbol out of them. In the special case of binary phase shift keying (BPSK) one bit is a symbol and no formatting is required. Moreover, the modulator circuit is simplified. In the present 16 level quadrature amplitude modulator (16 QAM), sixteen symbols have 16 different points on the signal space diagram. For example, if the transmitted signal is represented in terms of the sum of two quadrature frequency tones, i.e., $$f_c(t) = a\cos 2\pi ft + b \sin 2\pi ft$$

in a 4-symbol system each of the two levels can be represented by two binary digits with the "in-phase component" corresponding to the "a" coefficient taking on the values $+1$ and $-1$, and the "quadrature component" corresponding to the "b" coefficient taking on the same values leading to 4 possible combinations of "ab" values. The signal space diagram is simply a two dimensional graph of the "a" as absisca and "b" as ordinate.

For the present 16 QAM system the signal space diagram has 16 distinct points representing the 16 different values of the combination "ab". In other words 4 bits are required to uniquely define each point on the 16 QAM signal space for a data transmission rate of 4 bits per baud, or 4 bits per pulse. Thus, the symbol formatter 12 derives from the incoming data stream a pair of multi-level signals representing the in-phase and quadrature resolved components of the modulation on lines 14 and apply pulse shaping each of the components on lines 14 and 16 is passed through corresponding raised cosine filters 18 and 20' respectively. The filtered signals on lines 22 and 24 are mixed at mixers 26 and 28 with the carrier signal. The in-phase signal on line 22 is mixed with the carrier signal derived from carrier signal source 30 and shifted 90° by phase shifter 36 while the quadrature component on line 24 is mixed with the carrier as introduced at terminal 32. The two resulting signals on lines 40 and 42 are added in adder 44 to produce on output line 46 a combined signal having both phase and amplitude modulation.

There are several disadvantages to the method of figure 1. These include the need to carefully match the components of the filters 18 and 20, the quadrature splitting of the carrier by phase shifter 36, and the amplitude balancing of the separate components as affected by the symbol formatter 12, the raised cosine filters 18 and 20 and the mixers 26 and 28. The components in the latter assemblies are even then subject to variations in performance due to temperature and aging. While it is possible to reduce the above problems by using digital filtering and numerically controlled oscillators for quadrature splitting, the above-mentioned method of modulation still retains many of the problems indicated and, in addition, requires a relatively large number of components and, hence, space.

Figure 3:
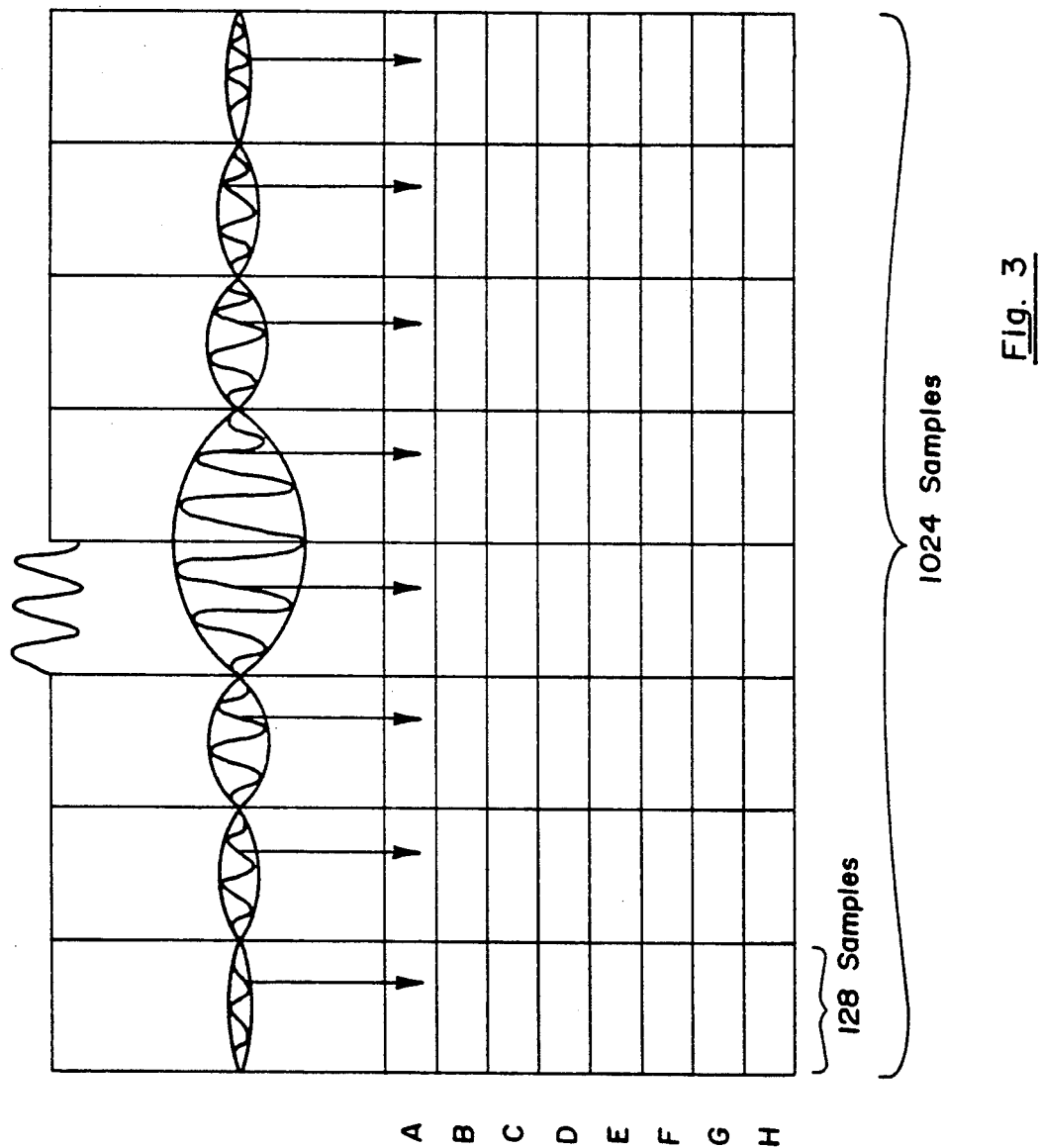
FIG. 3 compares an unfiltered response to a filtered one and how the values of a filtered response are stored in memory.

Referring to FIGS. 2a to 2f there is shown at 2a a set of five four bit symbols out a total possible number of 16 such symbols as comprise a 16 QAM modulator system. The input data is shown at 2b which corresponds to this data. A clock pulse waveform for clocking in the data is shown at 2c. In an analog system the input data would form a multilevel waveform as shown in $2d_1$ and $2d_2$. If there were no filtering the output of a carrier modulated by the input data would look as in waveform 2e and the 90° phase shifted waveform at 2f. However, with filtering the picture becomes more complex. As seen in FIG. 3 a single symbol period of modulated signal as in the top waveform while the filtered waveform consists of 8 separate envelopes corresponding to the 8 symbol periods some of which occur before the input pulse being filtered. In a real filter clearly signal components occurring earlier than the signal being filtered would not occur. However, such a waveform is useful in a system in which a real filter is not used.

Figure 4A:
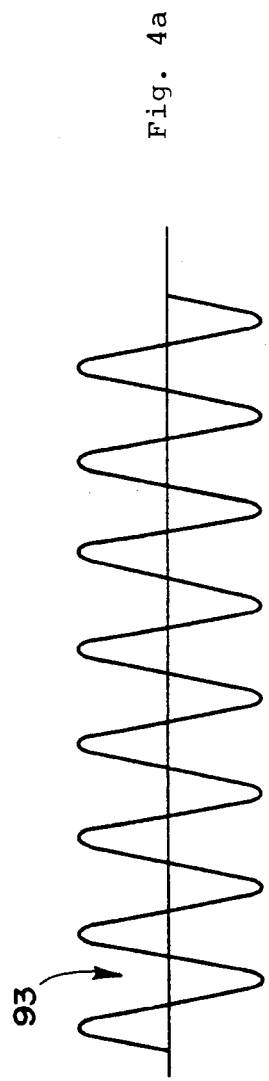
FIGS. 4a to 4c are a set of three waveforms showing a carrier wave, a filtered impulse response and the carrier modulated with the impulse response.
Figure 4B:
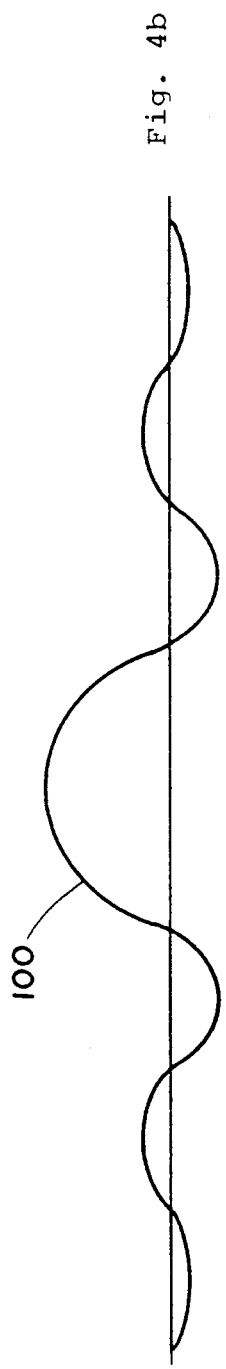
Figure 4C:
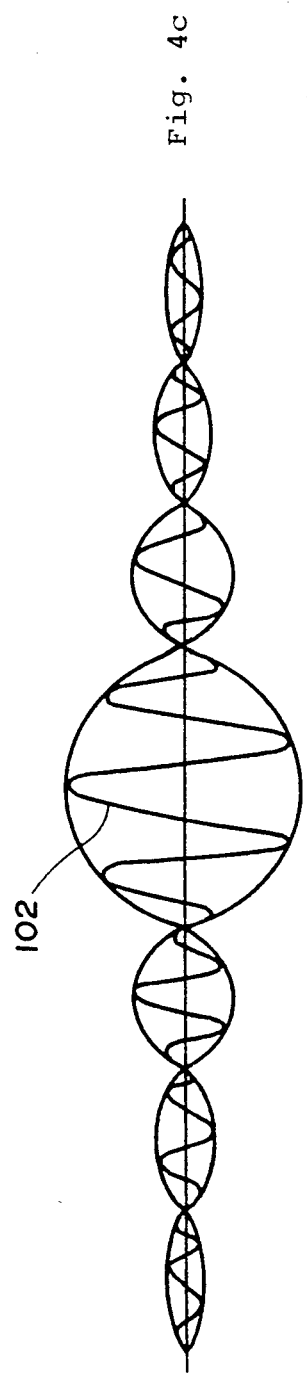

The modulated impulse response shown in the third waveform from the top in FIG. 4 is obtained by combining a full raised cosine filtered impulse over eight symbol periods for a given symbol with a carrier signal 93 as shown in the top waveform of FIG. 4. The carrier signal 93 is a periodic wave constant amplitude. The impulse response 100 for a full cosine filter for eight symbol periods when mixed with the carrier signal 93 produces a modulated carrier signal for each symbol impulse response 102.

Figure 5:
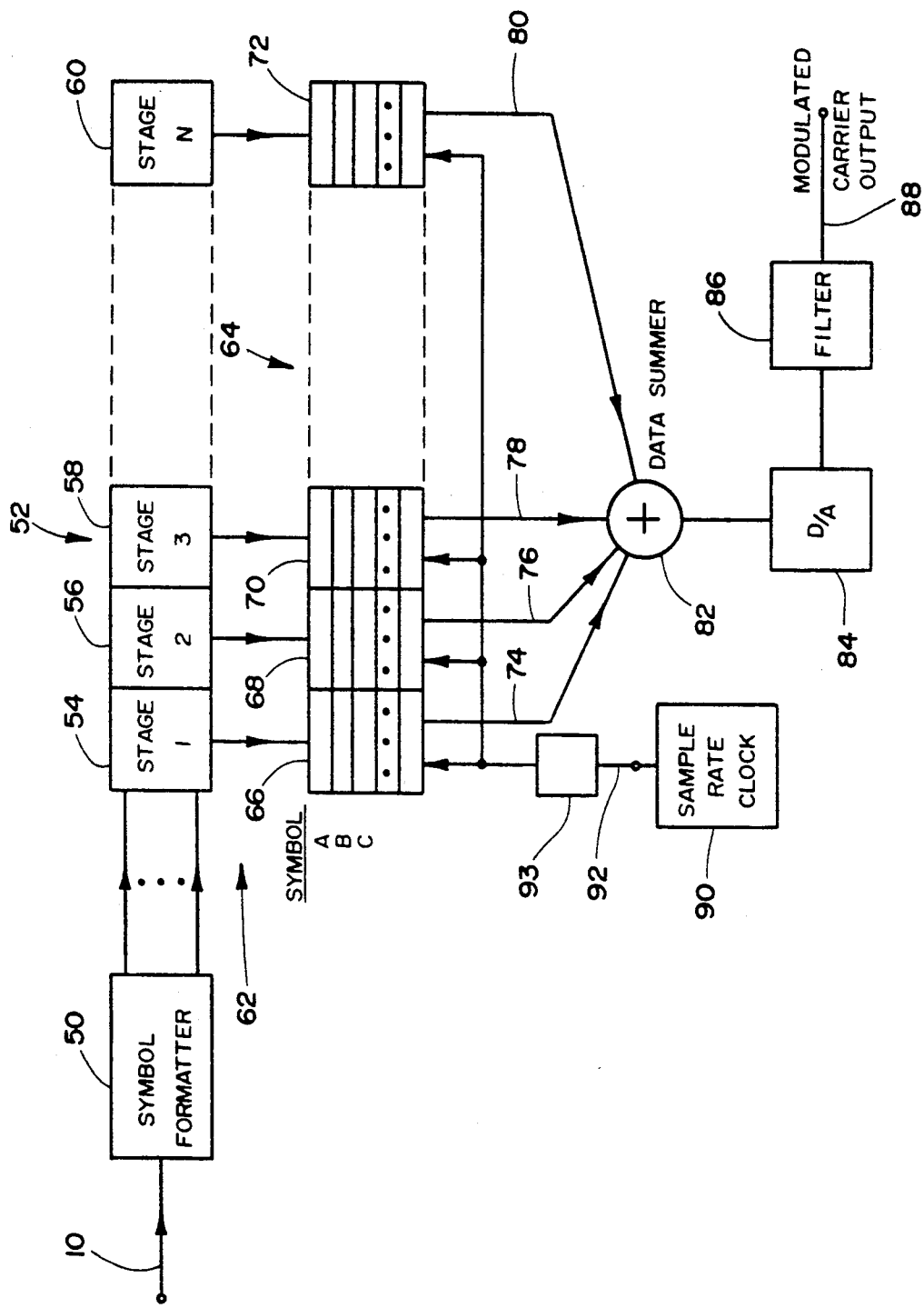
FIG. 5 is a flow diagram showing a preferred embodiment of a modulation scheme in accordance with the present invention.

Referring to FIG. 5, the 16 QAM modulator receives serial digital data on line 10 which is formed into four bit symbols in symbol formatter 50. Each four bit symbol is stored in a first stage 54 of a four bit wide, shift register 52, which in this example will have eight stages. Each subsequently received symbol causes all of the stored symbols to shift right to the next stage. Thus, at any given instant in time there are 8 symbols stored in stages 1 to 8 of shift register 52 and at the end of each symbol period a new symbol enters the first stage and each of the symbols previously in stages 1 to 7 shift forward to stages 2 to 8 with the last shifting out of the shift register 52.

The modulated carrier signal produced by modulation with each of the symbols is stored in a symbol modulated impulse memory 64 as shown in FIG. 5. Thus, memory 64 has stored a set of samples representing the modulated carrier signal for each symbol in the signal constellation over 8 symbol periods. For example, the bit sequence "1011" which corresponds to a particular symbol has a particular corresponding set of samples which represent the modulated carrier signal for that symbol including phase and amplitude variations and filtering. A total of 1024 sample values of the modulated carrier signal 102 are taken in eight blocks of 128 each and stored in memory 64. This process is repeated for the impulse response corresponding to each symbol in the signal constellation.

Thus, if the different symbols are designated by the letter A, B, C, etc., then FIG. 5 illustrates the way in which samples are stored in memory 64. For each symbol such as, for example symbol A, the first ⅛th of its record (the first 128 samples) are stored in the first block 66 of memory 64, the second eighth in the second block 68, the third eighth in block 70, etc., and the last eighth in block 72. The stored samples may be tailored in value to correspond to the modulated signal itself with any desired filtering, and with predistortion introduced to counteract the effects of amplitude and phase distortion in a transmission system. Thus, the memory has stored in it a set of samples representing the modulated carrier signal for each symbol in the signal constellation over eight symbol periods.

A sample rate clock 90 applies clock pulses on line 92 to the memory address counter 93 which connects to each stage of the memory 64 and is used to access the stored samples corresponding to the contributions from the overlapping memory records of each symbol. There are 128 cycles for each stage. The reason for having to extend the samples over several symbol periods is due to the fact that filtering causes the symbols to overlap and interfere with each other. Thus, the modulator needs to output a continuous sequence of modulated impulse responses with the overlap caused by the filtering.

Figure 6:
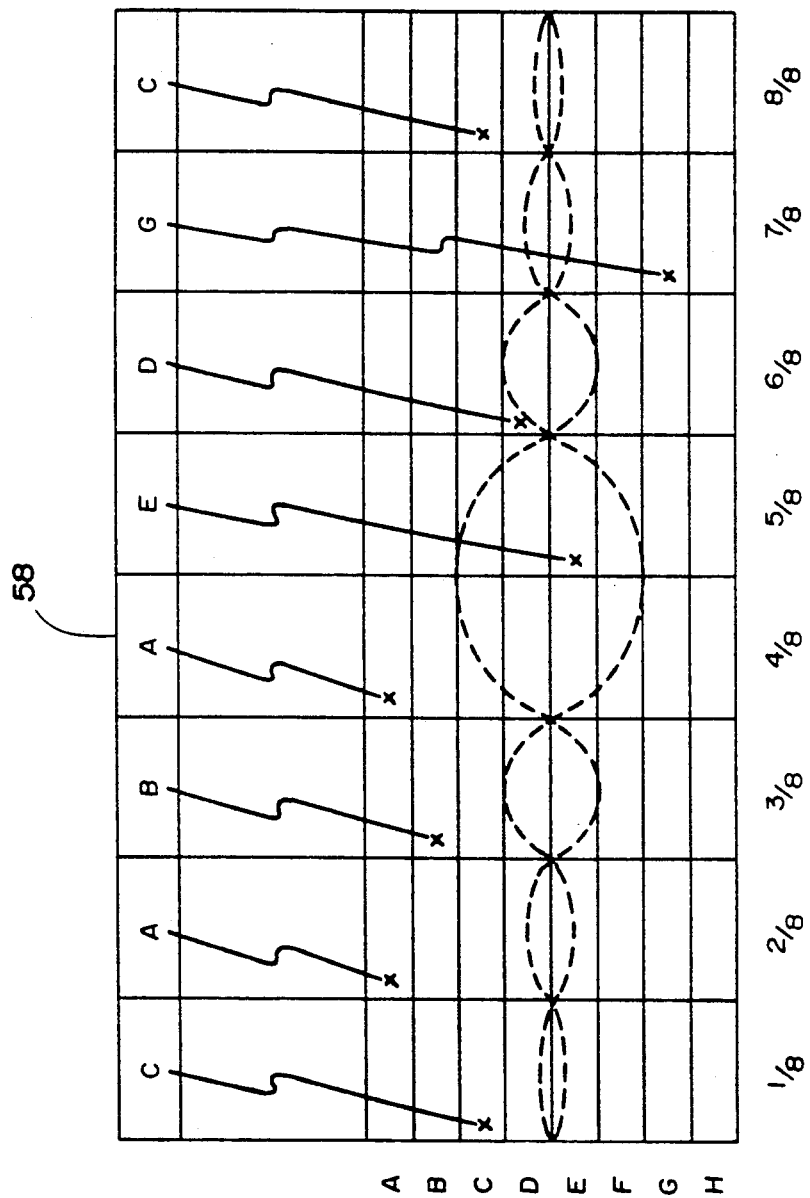
FIG. 6 is a schematic diagram showing how sample values are selected in accordance with the symbols stored in the shift register.

By dividing up the impulse responses and the corresponding blocks of memory into eight equal parts covering eight symbol periods, one may simply add up the values of the eight equal parts covering eight symbol periods. As illustrated in FIG. 6 assuming the eight stage shift register 58 has stored the symbols C, A, B, A, E, D, G, and C in positions to 8, respectively, the program examines the symbol in position determines it is C and then goes to the first block of 128 samples corresponding to symbol C in the memory 64. At the first sample instant, the first sample of the 128 samples in the first block corresponding to symbol C is taken, the first sample in the second block corresponding to symbol A in memory is taken, the first sample in the third block corresponding to symbol B in memory is taken and so on for all eight stages of the shift register. These values are added and then sent to the digital to analog converter 84. At the second sample instant, the second of the 128 samples is selected from the same selection of memory blocks. This process continues until the 128th sample is taken from the blocks corresponding to all eight stages. The shift register 52 is then shifted causing a different set of eight memory blocks to be accessed and the first sample to be accessed from each.

Sample values from the first block of memory are output on line 74 to the data summer 82. Sample values from the second, third, etc., to the eighth block are output on lines 76, 78, etc., and 80, respectively, to the data summer 82. The summed sample values which give the composite waveform are then directed to digital to analog converter 84. The resulting analog signal is then passed through a reconstruction filter 86 to remove unwanted elements of the sample frequency.

Figure 7:
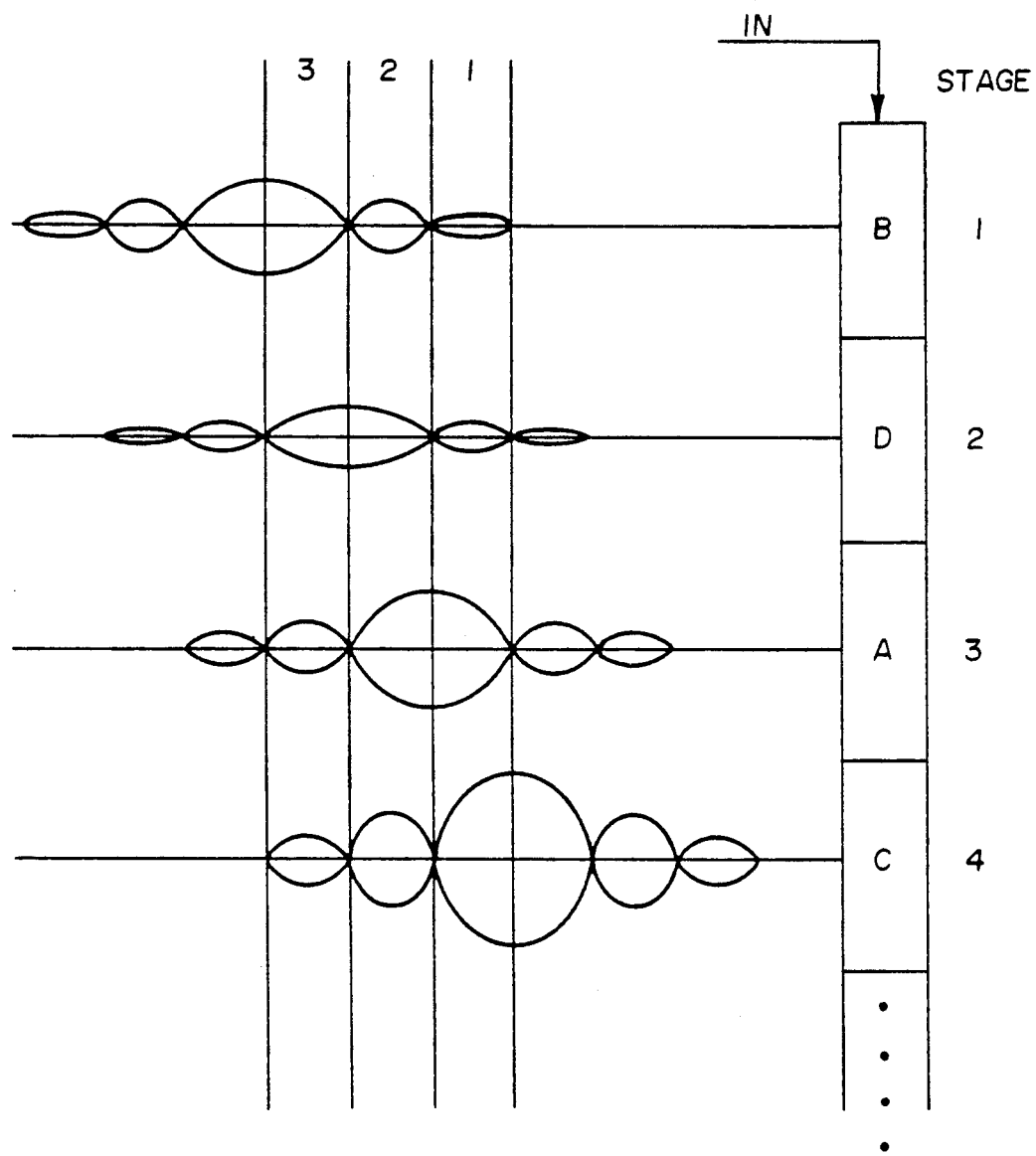
FIG. 7 is another schematic diagram showing how sample values for overlapping stored impulse responses are selected.
Figure 8:
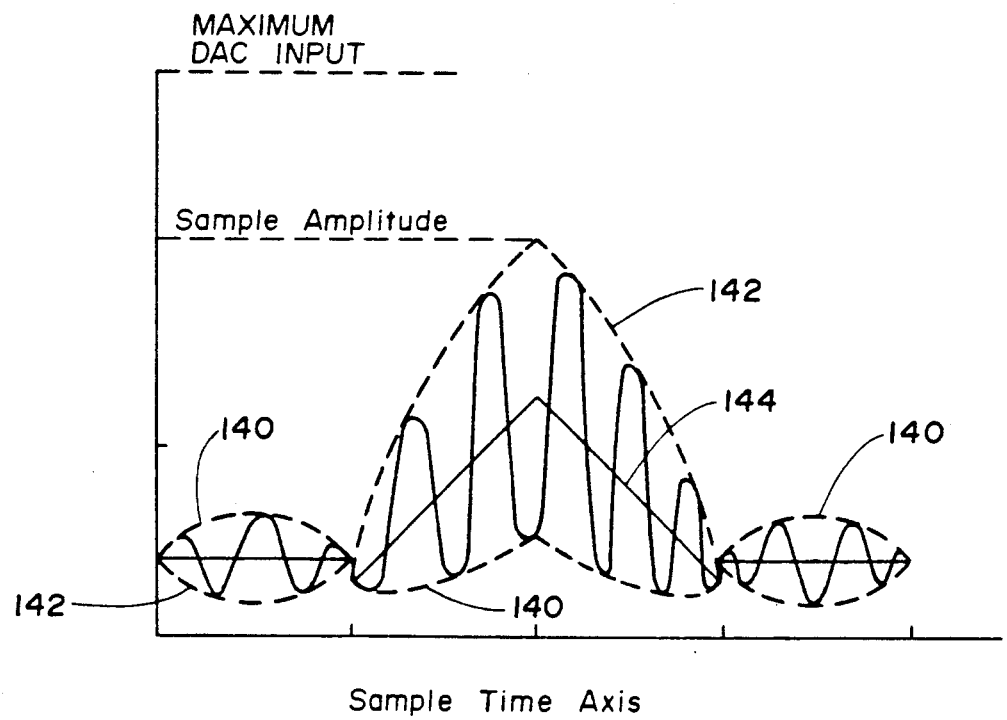
FIG. 8 is a graph showing the DC offset and the envelope of a modulated symbol impulse as stored in memory to maximize the use of the D/A converter dynamic range.

Referring to FIG. 7 the correspondence between the analog equivalent of how sample values for the various symbols are added and the digital method outlined above is shown. In the first sample period the first block of memory corresponding to sample values for the symbol B are added to corresponding sample values for the second block of symbol D, the third block of symbol A, the fourth block of symbol C, etc. until all eight blocks of sample values have been added to give a summed set of 128 sample values. The next symbol is then shifted into the first stage and the symbols in the subsequent stages are all shifted one stage with the one in the eighth position being discarded. Next the symbol values of the first block of the new symbol in the first stage are added to the sample values of the second block of symbol B, the third block of symbol D, the fourth block of symbol A, etc. until again corresponding sample values for all eight blocks have been added.

In order to avoid the sum of the various symbol impulse responses from exceeding the range of the Digital to Analog (D/A) converter 84 varying DC offsets are assigned to the values in the impulse response record. If only one symbol impulse response were stored in memory and only one were to be read out and sent to the D/A converter 84, then its maximum amplitude could use the entire numerical range of the D/A converter 84. In the case of an 8 bit converter there are 256 levels of amplitude ranging from 0 to 255. The central part of an impulse which has the maximum amplitude could sweep across this entire range without the possibility of exceeding the range of input of an 8 bit input D/A converter.

If two symbols were stored and the components of each were to be sent to a D/A converter, then it would be necessary to make sure that no sum of samples exceeded the maximum level of the D/A converter. If this sum ever did exceed the maximum level of the D/A converter, then the output of the D/A converter would be severely distorted. If for example, the sum of samples was 257 then such a value would cause the D/A converter to overflow and wrap around so that the effective input would be 2 (i.e. 255 plus 2).

In addition to the problem of staying within the numerical range of the D/A converter, it is important that there be no DC offset at the analog output of the converter. For an 8 bit converter with 256 levels the centreline is at the level 127 corresponding to the mid-range of output. Given that the modulated output fluctuates evenly about the centre line, by taking 127 as corresponding to 0 Volts DC at the analog output there would be no DC offset in the signal output.

One solution to have no DC offset and stay within the maximum range of the D/A converter would be to halve the maximum amplitude of the two stored impulse responses so that the centre value of each can be 63 or 64 with nothing being stored above 127 in either section of memory. However, the latter method would waste available memory and halve the resolution of the individual stored impulse responses. The latter situation is worsened as the number of contributing impulse responses increases. With eight impulse responses to combine, an individual contributor uses only one eighth part of the available memory. Moreover, the values become quite coarsely stepped due to the limited number of bits used to describe their sample levels. This effect would degrade the spectral quality of the output to an unacceptable degree.

The solution to this problem is to rely on the fact that the sum of contributions always consists of small amplitudes from the earliest and latest symbol periods of impulses and large amplitudes from the symbol periods close to the centre of the impulse response. Any addition of eight samples always takes one from each ⅛ section of the memory. This means that for any group of eight from any position in the blocks of 128 the sum must not exceed 255 and the centre value must be 127.

These criterion are achieved by giving the samples in memory an offset closer to zero if they are at a part of the impulse which has a smaller amplitude and a larger offset if they have a larger amplitude. Referring to FIG.

8 there is shown a single modulated impulse record showing its maximum amplitude envelope 142 & 140 and also the centre of the envelope 144. It will be seen that the offset in the central region of larger amplitude is taken to increase linearly from each side thereof to valid output to a D/A converter on its own but when combined with adjacent ones in time, before and after, stored with the same pattern of offset, the resultant combination will cause a valid output with a constant DC value at the centre of the D/A converter output range. This is so because the increasing ramp on one side of the central lobe is added to a decreasing ramp on the other side of a different central lobe for each symbol period of the eight symbol periods over which sample values are added to yield a constant value which is added to the constant values for each of the other blocks of sample values.

Figure 9:
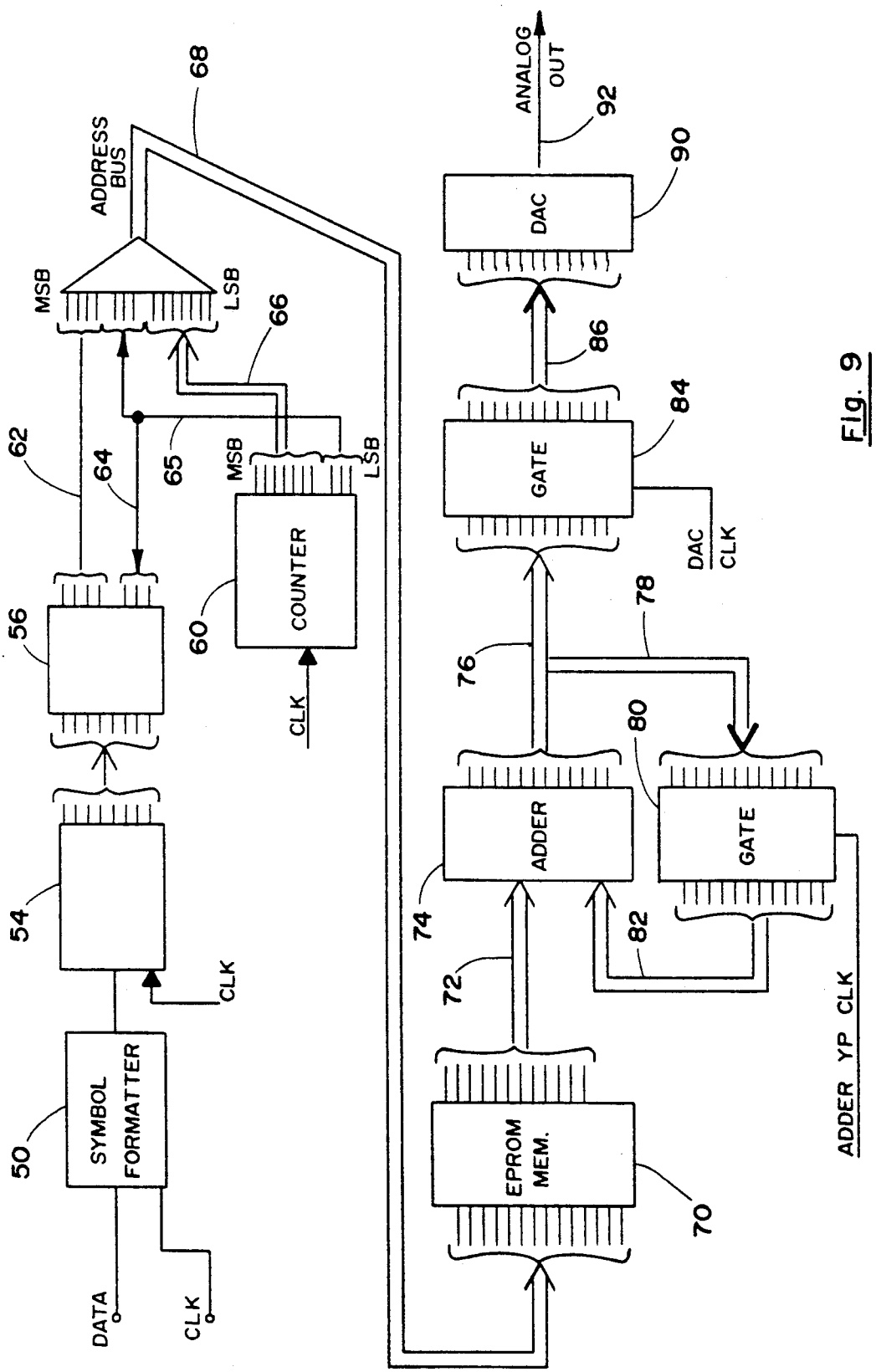
FIG. 9 is a block diagram for implementing the scheme outlined in FIG. 5 hereof.

A more detailed schematic diagram of a preferred embodiment of the invention illustrated in FIG. 5 is shown in FIG. 9. In this case the shift register 54 has 8 output 4 bit bus lines, one for each of the 8 stages. Outputs from each stage drive corresponding 4 bit inputs of a decoder 56. Decoder 56 has four output lines applied to bus 62, one corresponding to each of the four bits of the symbols. These outputs constitute four address bits for sample memory 70. Sample memory is made up of an array of electronically programmable read only memory cells. The remaining 10 address bits are generated by counter 60 on bus lines 65 and 66. The counter 60 is clocked at 8 times the sample rate. The bits on lines 64 and 65 are the least significant bits of the counter 60 which select, in sequence, the 8 inputs to decoder 56. After each count of 8, the count on bus 66 increments by 1. The combination on line 64 defines which of the four bits of the eight four-bit symbols stored in the shift register 54 are output on bus line 62. Thus, bus lines 62, 64 and 66 form a 14 bit address which is carried by address bus 68 to EPROM memory 70.

Each sample retrieved corresponding to the 14 bit address bus is a 12 bit number the output for which is carried on bus line 72 to adder 74. The number on bus line 72 is added to that on bus line 82, which initially is zero, to form a summed output on bus transfers the sum to the output line 82 when a new sample value arrives on line 78. Thus, adder 74 and gate 80 form an iterative sum of the sequence of sample values appearing on line 72. Once all 8 sample values for a given sample period have been retrieved from memory 70 and added by adder 74, the sum is directed into gate 84 and gated by the D/A converter clock into the D/A converter 90. The analogue output from D/A converter 90 appears on line 92. These steps are repeated for each sample instant.

Referring to FIG. 10 there is shown an impulse response resulting from a root raised cosine filter. The response extends over an infinite time but the energy before and after a certain amount of time from the peak is relatively insignificant. Most of the energy is concentrated within a few symbol periods of the occurrence of the symbol and the impulse response can be truncated by ignoring the contributions from before and after this time. Simulation can be done to determine the amount of the impulse response required. Equal amounts of the response from before and after the peak make the output non-causal but produce the best performance as does truncation of the impulse response at a zero crossing. Computing the inverse Fourier Transform one gets the diagram of FIG. 11 a close up of the first two peaks of which is shown in FIG. 12. It is observed that the amplitude of the second peak is approximately 35 decibels below that of the first one.

To examine the effect of truncating at the second zero crossing rather than at the fifth as in FIG. 10, as shown in FIG. 13, the calculation of the inverse Fourier Transform taking 1024 points as in FIGS. 10 and 11 gives the spectrum of FIG. 14 and the close up of FIG. 15. In this case the second peak is more pronounced being 27 decibels below the first one. Truncation as in FIG. 13 may be employed in calculating the memory records for each symbol. In some cases truncation at the second zero crossing might be adequate. Memory records are individually calculated by multiplying the impulse response by a carrier sine wave with an amplitude and phase for each of the required symbols. Thus, each memory record is a filtered modulated carrier wave for each symbol in the constellation stretching over several symbol periods.

Thus, the modulated signal is generated directly and digitally at the carrier frequency complete with the phase and amplitude variations and filtering. Clearly, filter characteristics can be changed by simply changing the contents of the digital memory. Thus, a variety of modulations can be generated from a single modulator using the present technique. Moreover, factors such as predistortion can easily be added to counteract the effects of amplitude and phase distortion in a transmission system.

It is possible to reduce the amount of memory required by using the same memory locations for symbols with equal amplitude and exactly opposite phase by simply inverting signals for one and not the other. Similarly, symbols with the same phase and different amplitude could use the same memory by multiplying the output to the required amplitude. Although the invention has been described with respect to a 16 QAM scheme, the method can also be applied to phase shift keying (M-PSK), M-QAM where M is other than 16, and M-QPRS.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

I claim:

1. A digital modulator for modulating a stream of incoming data bits in which a predetermined number of such bits, constituting a set, corresponds to a symbol, comprising:
   (a) means for storing each incoming set of symbol bits, where there is at least one bit in each set, of "n" successive symbols where "n" is a positive integer with a value greater than or equal to 1, with the oldest stored set being discarded upon the arrival and storage of a next set of symbol bits;
   (b) memory means for storing sample values corresponding to a modulated symbol impulse response for each of a predetermined number of symbols wherein the modulated symbol impulse responses each extend over "n" symbol periods;
   (c) means for retrieving sample values over one symbol period from said memory means for overlapping portions of each of the modulated symbol impulse responses stored in said storing means;

(d) summing means for summing the sample values which correspond to each other in time for each of the modulated symbol impulse responses corresponding to the received symbols; and (e) converter means for converting summed digital sample values to an analog signal for subsequent transmission.

2. A modulator according to claim 1, wherein said storing means is a shift register.

3. A modulator according to claim 1, wherein said memory means is programmable semiconductor memory array.

4. A modulator according to claim 1, wherein said converter means is a digital to analog converter.

5. A modulator according to claim 1, wherein said retrieving means includes a decoder having "n" symbol inputs and a counter having sufficient least significant bit lines coupled to a select input to said decoder so that data on any one of the "n" symbol bus lines applied to symbol inputs of said decoder may be selected and applied as most significant address bits to said memory means and least significant bit lines of said counter are applied as least significant address bits to said memory means.

6. A digital modulator for modulating a stream of incoming data bits in which a predetermined number of successively incoming ones of such bits, constituting a set, correspond to a symbol, comprising:

(a) means for temporarily storing, in parallel, incoming symbol data bits of "n" successive symbols where "n" is a positive integer with a value greater than or equal to 1, with the oldest stored symbol bits being discarded upon the arrival and storage of a next set of symbol bits;

(b) memory means for storing sample values corresponding to a modulated symbol impulse response for each of a predetermined number of symbols wherein the modulated symbol impulse responses each extend over "n" symbol periods;

(c) means for retrieving, in sequence, sample values from said memory means corresponding to symbols stored in said storing means in pre-selected time intervals over a symbol period for overlapping portions of each of the modulated symbol impulse responses corresponding to the symbols stored in said storing means;

(d) an adder coupled to said retrieving means and operative to sum the retrieved sample values which correspond to each other in time; and (e) a digital to analog converter coupled to an output of said summing means and operative to convert each sum of sample values for each symbol period to an analog signal for subsequent transmission.

7. A modulator according to claim 6, wherein said storing means is a shift register.

8. A modulator according to claim 6, wherein said memory means is programmable, non-volatile semiconductor memory array.

9. A modulator according to claim 6, wherein said digital to analog converter is provided with an offset which rises linearly to a maximum at a central lobe of an envelope of an impulse response and is substantially horizontal for the side lobes with an average summed value equal to the mid range of the digital to analog converter.

10. A modulator according to claim 6, wherein said retrieving means includes a decoder having "n" symbol bus inputs with each bus having a number of bit lines corresponding to a symbol and a counter having sufficient least significant bit lines coupled to a select input to said decoder so that data on any one of the "n" symbol bus lines applied to symbol inputs of said decoder may be selected and applied as most significant address bits to said memory means and least significant bit lines of said counter are applied as least significant address bits to said memory means.

11. A digital modulator for modulating a stream of incoming data bits in which a predetermined number of successively incoming ones of such bits correspond to a symbol, comprising:

(a) a symbol formatter having an input coupled to said stream of incoming data bits, said formatter operative to arrange incoming symbol bits for each symbol in parallel;

(b) a shift register coupled to an output of said symbol formatter having "n" stages for storing in parallel incoming symbol bits of "n" successive symbols where "n" is a positive integer with a value greater than or equal to 1, with the oldest set of stored symbol bits being discarded upon the arrival and storage of a next set of incoming symbol bits;

(c) digital semiconductor memory for storing sample values corresponding to a modulated truncated symbol impulse response for each of a predetermined number of symbols wherein the modulated truncated symbol impulse responses each extend over "n" symbol periods;

(d) means for retrieving in sequence sample values from said memory corresponding to a given interval of time equal to a symbol period for overlapping portions of each of the modulated truncated symbol impulse responses stored in said storing means;

(e) an adder having an input coupled to said memory for summing corresponding sample values received from said memory and operative to add sample values which correspond in time for overlapping portions of each of the modulated truncated symbol impulse responses stored in said memory and corresponding to the symbols stored in said storing means sequentially in predetermined time intervals over a symbol period; and (f) a digital to analog converter means for converting each sum of sample values for each symbol period to an analog signal for subsequent transmission.

12. A modulator according to claim 11, wherein said means for retrieving includes a decoder having "n" symbol bus inputs with each bus having a number of bit lines corresponding to a symbol and a counter having sufficient least significant bit lines coupled to a select input to said decoder so that data on any one of the "n" symbol bus lines applied to symbol inputs of said decoder may be selected and applied as most significant address bits to said memory and least significant bit lines of said counter are applied as least significant address bits to said memory.

13. A modulator according to claim 12, wherein sample values corresponding to each symbol stored in said storing means are retrieved serially from said memory and added by said adder as each said set is retrieved from said memory until sets of values for all symbols stored in said storing means have been added.

14. A modulator according to claim 11, wherein each symbol impulse response is truncated at a zero crossing at equal time intervals before and after the peak.

15. A modulator according to claim 11, wherein the modulated symbol impulse response is that as filtered by a cosine filter.

16. A modulator according to claim 11, wherein varying DC offsets are included in the stored impulse response sample values of a magnitude proportional to the amplitude of each response sample value so that offsets at each of said predetermined time intervals when summed add up to the centre point of the input range of the digital to analog converter.

17. A modulator according to claim 14, wherein said the stored offsets in the central lobe of the envelope for each store impulse response rises linearly from each side of the lobe to a central maximum.

* * * * *

UNITED STATES PATENT AND TRADEMARK OFFICE
CERTIFICATE OF CORRECTION

PATENT NO. : 5,177,455
DATED : January 5, 1993
INVENTOR(S) : Steven John Bennett It is certified that error appears in the above-indentified patent and that said Letters Patent is hereby corrected as shown below:

Column 3, line 47, after "lines 14 and" insert --16, respectively. In order to prevent intersymbol interference and--;

Column 4, line 31, delete "wave" and substitute therefor --waveform--;

Column 5, line 30, after "positions" insert --1--;

Column 5, line 31, after "positions" insert --1--;

Column 7, line 5, after "thereof to" insert --a maximum value at the centre. This symbol would no longer be--; and Column 7, line 43, after "bus" insert --line 76. The latter sum is carried by line 78 to gate 80 which--

Signed and Sealed this

Second Day of August, 1994

Attest:

BRUCE LEHMAN

*Attesting Officer*  *Commissioner of Patents and Trademarks*